United States Patent [19]
Christensen et al.

[11] Patent Number: 5,932,111
[45] Date of Patent: Aug. 3, 1999

[54] PHOTOELECTROCHEMICAL REACTOR

[76] Inventors: Paul A. Christensen, 11 Copper Chare, Morpeth, Northumberland NB61 1BS, United Kingdom; Graham V. Hutson, 3 Denton Park, Gosforth, Nr Seascale, Cumbria CA20 1BG, United Kingdom

[21] Appl. No.: 08/750,969

[22] PCT Filed: Jun. 16, 1995

[86] PCT No.: PCT/GB95/01417

§ 371 Date: Feb. 28, 1997

§ 102(e) Date: Feb. 28, 1997

[87] PCT Pub. No.: WO96/00189

PCT Pub. Date: Jan. 4, 1996

[30] Foreign Application Priority Data

Jun. 24, 1994 [GB] United Kingdom ............... 9412752
Apr. 1, 1995 [GB] United Kingdom ............... 9506803

[51] Int. Cl.$^6$ ............................... C02F 1/32; C02F 1/48; C02F 1/72
[52] U.S. Cl. ............ 210/748; 210/192; 210/198.1; 210/205; 422/24; 422/186.3
[58] Field of Search ............... 210/748, 198.1, 210/205, 192; 422/24, 186.3

[56] References Cited

U.S. PATENT DOCUMENTS 5,151,252  9/1992  Mass ........................... 422/186.3
5,364,508  11/1994  Weres et al. ..................... 204/128

FOREIGN PATENT DOCUMENTS 0149816  7/1985  European Pat. Off. .
0186149  7/1986  European Pat. Off. .
WO94/19284  9/1994  WIPO .

Primary Examiner—Neil McCarthy
Attorney, Agent, or Firm—Nixon & Vanderhye P.C.

[57] ABSTRACT

The invention relates to an apparatus, and aspects thereof, and a method for the decomposition of organic material and/or micro-organisms in a solution. The apparatus and the method concerns the provision and irradiation of a semiconductor material in the presence of an applied voltage so as to ensure that electrons liberated by a photochemical reaction are transported away from the semiconductor material, so aiding decomposition of the organic material and or micro-organisms. Further the invention concerns the use of a thermally formed semiconductor film and/or an aerogel semiconductor film for the decomposition of organic material and/or micro-organisms; and also the use of a doped semiconductor film.

31 Claims, 9 Drawing Sheets

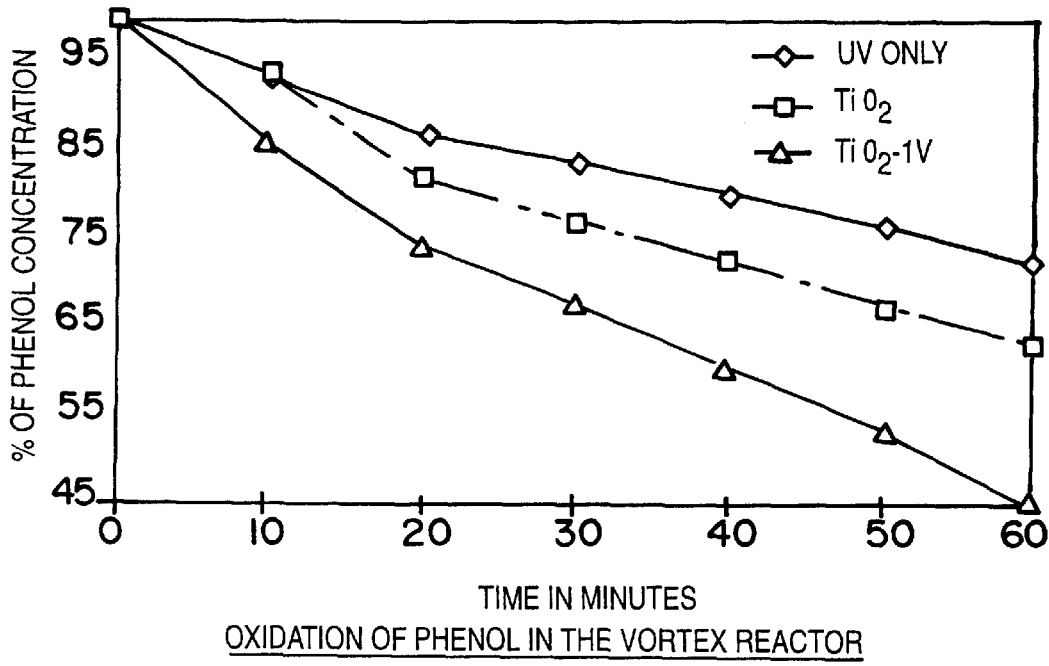
Fig. 5 — OXIDATION OF PHENOL IN THE VORTEX REACTOR
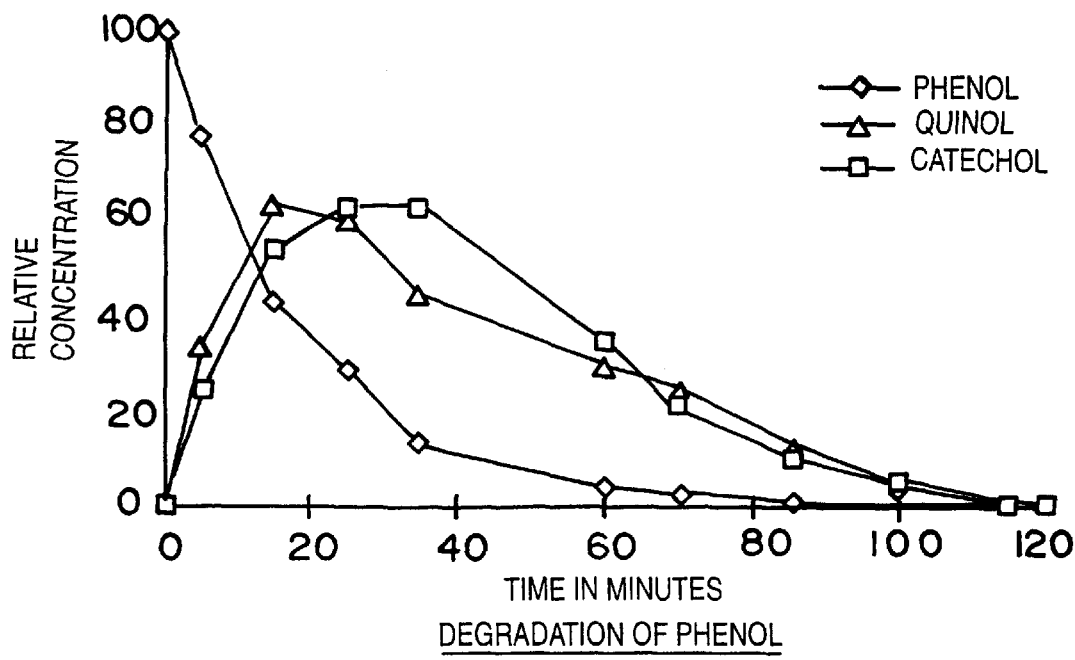
Fig. 6 — DEGRADATION OF PHENOL

PHOTOELECTROCHEMICAL REACTOR

The invention relates to an apparatus, and aspects thereof, for the decomposition of organic materials, for example for the treatment of organic solutions, liquids containing waste organics rendered unsuitable for discharge in effluent and particularly, but not exclusively, for the purification of waste containing organic residues or compounds in the free phase or in aqueous solution.

For the avoidance of doubt, the apparatus of the invention relates to and can be applied to the disinfection of water with respect to particular end-users, for example it can be applied to the removal of micro-organisms such as bacterial pathogens from water supplies.

Waste organic liquids either in the free phase or in solutions, aqueous or otherwise, are a necessary by-product of many operations in chemical, nuclear and related industries. Their disposal is increasingly becoming a problem as traditional methods of disposal, for example, incineration, land fill, discharge to sewer etc become unacceptable with increasingly stringent environmental protection legislation.

For example, a large amount of industrial waste contains contaminants or pollutants such as organic residues and organic or inorganic electrolytes either in the free phase or in aqueous solution. The costs of cleaning such waste using traditional technologies such as extraction and combustion are very high. Moreover, stringent environmental protection legislation dictates the levels of acceptable effluent discharge and so the degree to which waste must be cleansed before it can be released into the environment. More recently, the Biological Oxygen Demand quotient has been replaced by the Total Organic Content quotient and thus the emphasis has been switched from monitoring the viable organic content of an effluent to the non viable, or synthetic organic content of an effluent. There is thus a need to provide an apparatus which cost effectively removes, at least, the organic contaminant from an effluent to such an extent that acceptable TOC values are provided, and also ideally destroys microorganisms such as bacteria and protozoa, including developmental stages of such organisms.

It is also significant to note that organic compounds tend to complex with other agents and therefore the removal or breakdown of organic compounds is a prerequisite to the removal or extraction of said agents. For example, the removal of heavy metals and radionuclides is effected using conventional techniques such as biodegradation, precipitation, ion-exchange, or evaporation, after heavy metals and radionuclides have been separated from organic complexing agents.

There are a number of methods currently available for the removal of organic contaminants.

For example, oxidation of the organic contaminant, either biologically or chemically using an oxidising reagent (such as chlorine, ozone, hydrogen peroxide, potassium permanganate etc) can be undertaken. Although biological treatment is widely used it is ineffective against those contaminants which are not easily oxidised or those contaminants which are too toxic for a biological species to be employed. The use of oxidising reagents is less favoured because the agents tend to be expensive and can produce unwanted intermediates which themselves require treatment.

An alternative method concerns photolysis, that is irradiation of a solution with UV or short wave length visible light. Unfortunately, this technique has limited use on a wide range of contaminants and is also a relatively slow process because of the nature of the reaction rates involved.

Alternatively, photo-oxidation can be practised. This is essentially a combination of the above two mentioned methods. In this process, contaminated aqueous solution is simultaneously dosed with oxidising reagents and irradiated with UV or short wavelength visible light. Typically, there is a synergistic effect and the oxidising rates achieved are thus dramatically increased. However, in general, the technology is expensive and can produce intermediates which are themselves contaminants and resistant to further oxidation.

Alternatively, electrochemical oxidation can be practised. If a contaminated effluent is electrically conducting, then electrochemical cells can be used for the removal of organic contaminants therein. The choice of electrode materials and applied voltage levels are dictated by the nature of the contaminants. Oxidation of organic contaminants at the electrode have been reported, but the technique is more typically used to remove metals or to disinfect aqueous streams. Electrochemical technology is widely established for the production of specialist chemicals, with chlorine production being the most well known example.

Alternatively, photoelectrochemical oxidation can be practised. This technology is very similar to photo-oxidation but the need to add oxidising reagents is eliminated because oxidising agents are generated from solution, the most useful of these being the hydroxyl radical (OH). This radical is capable of destructively oxidising an extremely wide range of organic compounds including those known to be relatively resistant to oxidation such as carboxylic acids. The OH· radical can be generated in solution by a variety of methods but the most commonly used technique involves the photochemically-induced decomposition of water by the irradiation of a semiconductor/solution interface. UV or short wavelength visible light irradiation of a suitable semiconductor, such as Titanium Dioxide, which is in good contact with a well oxygenated solution produces high oxidation rates of a wide range of contaminants, and producing low levels of intermediates.

The overall efficiency of this process depends on four important parameters.

a) Oxygen (normally from air) must be continuously available to the solution and in addition, the mass transfer characteristics are important.

b) The contaminant organic must have effective mass transport to the semiconductor surface for subsequent absorption.

c) Irradiation must be simultaneously and efficiently applied to the greatest possible semiconductor surface, and d) The fact that, the photochemical reaction generates positive charges, known as holes, and negative charges, electrons. The holes move to the surface of the semiconductor and oxidise adsorbed organic material, and the efficiency of this reaction depends upon the rapid separation of electrons and holes and also the rate at which electrons and holes recombine. Recombination is undesirable because it results in the loss of energy from the absorbed light in the form of waste heat It is known that recombination is more likely to occur when electrons/holes have to travel a distance of approximately greater than 0.1 micrometer before contacting organic material. It therefore follows that the composition and geometry of the semiconductor surface is important, with a small particulate, or film, thickness being essential.

In an alternative form of photoelectrochemical oxidation, oxidation of an organic solution, in the absence of aqueous solution or an aqueous electrolyte can be practised in a manner similar to that aforedescribed. Exposure of a semiconductor material to irradiation results in the generation of electrons and holes and these holes, upon migration to the semiconductor surface, interact with organic compounds and residues so as to bring about the decomposition of same. It therefore follows, that photoelectrochemical oxidation can be practised in the absence or presence of an aqueous solution or a solution which comprises or contains a potential oxidising reagent.

For the destruction of micro-organisms, such as, but not limited to bacteria and protozoan, chlorination is typically the final disinfection step in most water treatment plants. This chemical is effective in removing the majority of bacterial pathogens, including the faecal coliform *Escherihia Coli* (*E-Coli*) which is employed as an indicator of water quality. However, whilst *Giardia Lamblia* (an enteric protzoan which has emerged in recent years as an important cause of endemic and epidemic diarrhoea) can be killed by chlorination, it requires relatively high levels of chlorination, c 4–6 mg per liter. Such high levels of chlorine, as well as having cost and taste implications, may represent a health hazard since contaminated water supplies which contain dissolved organic species may form halogenated compounds when disinfected by chlorination.

Chlorination is ineffective against *Cryptospiridiunm Parvu*, Cp, and the contamination of water supplies by Cp has become of serious concern in recent years following the infection of more than 500 people in parts of Oxfordshire and Swindon in 1989, and over 13,000 people in Georgia, USA in 1987. After the outbreak in Britain, a panel of experts was set up to investigate the problem of Cp in water supplies, and this panel reported that "The group regards research into disinfection as of paramount importance".

Cp is a highly infectious parasite protozoan, the thick walled oocyst is 4–5 $\mu$m in diameter and environmentally robust. Oocysts have been detected in surface waters, groundwater, springs and drinking water samples, including those treed by conventional methods that met accepted standards of water quality in the country concerned. Cp may penetrate reasonably readily through sand filters. Cp is a significant pathogen of human beings, causing severe protracted diarrhoea in immunocompetent patients, (and is therefore a common and life-threatening condition in AIDS patients), and acute, though self limiting, enteritis in immunocompromised patients. The most commonly infected group are infants between 1 and 5 years, and as yet there is no effective specific drug treatment.

The potential scale of the Cp problem is significant; human wastewater can contain varying numbers of oocysts depending upon the size of the community and the rate of infection with the population, but typical figures are c. 13,700 per liter of raw sewage, and c. 1,300 per liter of treated sewage. The number of oocysts required for infection is not known for certain, but may be as low as one.

A variety of photoelectrochemical reactors have been designed with a view to improving the overall efficiency of the waste removal process and in particular the removal of organics from a solution by the photoelectrochemical process. Broadly speaking, these reactors can be divided into two types:

i) Slurry reactors which contain fine particles of semiconductor in a stirred suspension which has sparged oxygen added, and ii) Immobilised or Supported Catalyst reactors in which the semiconductor is deposited as a thin layer on suitable materials.

In the former there is high mass transfer of the contaminant to the semiconductor particle surface. To date, Titanium Dioxide particles have commonly been employed usually in the form of a slurry with the effluent to be treated and this slurry is irradiated with ultraviolet light of energy greater than that of the band gap of the semiconductor. Absorption of the ultraviolet light promotes an electron to the conduction band, leaving behind a positive hole in the valence band. The hole is then thought to react with water at the surface to generate a hydroxyl radical, which is a powerful general oxidant; the electron is similarly captured by an oxidant such as molecular oxygen. A serious disadvantage of the slurry reactor is the subsequent removal of the photocatalyst particles which requires the treated effluent or reactor products to be either filtered or undergo a settling process. As a result of the necessity for small diameter particles (see d) above), long settling times are required. Other disadvantages lie in the fact that the radiation is attenuated by the suspension and thus uniform irradiation to all zones within the reactor is prevented. There is also a need to supply oxygen uniformly throughout the reactor.

With immobilised catalyst reactors the major advantage is that the catalyst is retained in the reactor, mass transfer problems can be overcome by careful reactor design by using thin liquid layers over the semiconductor surface. This thin liquid film does however involve flowing oxygen into the fluid. Also, if thin liquid layers are used and the surface is irradiated through this layer, then there is little attenuation of the light before it reaches the surface. With these reactors this liquid film can be produced by:

i) A small diameter tube which is helically coiled around a light source. The catalyst is supported on the inner walls or on beads within the tube.

ii) The centrifugal action of a rotating disc supporting a thin layer of catalyst and the thin liquid film. The light irradiates from above.

iii) Liquid failing down the inner wall of a vertical tube. The semiconductor is deposited on the inner wall and the UV light is located vertically on the central axis.

v) The weir effect of liquid flowing over an inclined plane with irradiation from above and the semiconductor deposited on the plane surface.

However, despite the amount of investment in the design of efficient reactors the ratio of oxidation of organic compounds to incident light intensity is very low (less than 1%). This is because of the hitherto mentioned recombination that can occur between electrons and holes, despite the provision of thin films in the order of 0.1 micrometer.

We therefore considered that if it was possible to prevent, inhibit or mitigate recombination of elections/holes it might be possible to increase the efficiency of the reactor because this in turn would increase the number of OH· radicals available for the oxidation of organic compounds, and/or the destruction of bacteria.

Since OH· radicals are responsible for the oxidation of organic compounds and/or the destruction of bacteria and since electrons are responsible for the reduction of oxygen in solution we considered that separation of the oxidation and the reduction processes, electrochemically, by the application of a suitable voltage, would result in the separation of electrons/holes and thus increase the efficiency of the photochemical reaction.

We therefore considered that the semiconductor catalyst could be used to act as an electrode and a counter electrode could be used as a current collector. Thus, holes would migrate to the semiconductor surface to effect oxidation of organic compounds and electrons would be collected by the current collector and ideally transported to a cathode where reduction of oxygen could take place.

In addition, we have also considered that the semiconductor catalyst could be applied in a photoelectrochemical cell to disinfect water. We believe this process of disinfection is rendered efficient by the fact that virtually all organisms are relatively charged and will thus be attracted to the $TiO_2$ surface only to be killed on contact or in the near-surface layer. This fact alone greatly reduces the mass transport disadvantage inherent in using immobilised films of $TiO_2$ slurries and yet retain the advantage of the electric field effect and the lack of need to separate the catalyst from the treated water.

It is therefore an object of the invention to provide an apparatus for removing, at least, organic contaminants and/or micro-organisms such as bacteria, especially, bacterial pathogens from an effluent in a cost effective and efficient manner.

In its broadest aspect the invention concerns the application of a voltage to a layer of semiconductor material. In the embodiments described herein a battery-type arrangement is provided, but any other arrangement; such as the provision of a capacitor, may be provided to ensure that a voltage is applied to a semiconductor material.

According therefore to a first aspect of the invention there is provided an apparatus for treating a liquid to decompose organic material and/micro-organisms contained therein which comprises:

a reactor, over which, in use, the liquid flows, comprising a substrate which is at least partially coated with a film of semiconductor material and which is orientated with respect to an irradiation source such that radiation from said source can be absorbed by said semiconductor material to bring about a photochemical reaction; and further wherein there is provided a voltage means whereby a voltage can be applied between said semiconductor material and another material so as to ensure that electron liberated by said photochemical reaction are transported away from said semiconductor material.

In a preferred embodiment of the invention said liquid comprises an aqueous electrolyte for decomposing organic material contained therein.

In a preferred embodiment of the invention said liquid comprises effluent from a water treatment plant.

In yet a further preferred embodiment of the invention the other material is a counter electrode which is spaced from the semiconductor material by a predetermined distance, which distance is selected, at least, to accommodate a layer of said liquid and the voltage means is used to apply a voltage across said semiconductor material and said counter electrode.

In a preferred embodiment of the invention there is further provided at least one artificial irradiation source which is positioned with respect to the apparatus such that radiation emanating therefrom is directed towards said semiconducting film. By the term artificial irradiation source, we mean any such source other than natural sunlight.

In a further preferred embodiment of the invention said reactor is adapted such that liquid to be treated flowing thereon traces the form of a vortex. Ideally, in order to achieve this, liquid is delivered tangentially, with respect to the horizontal plane of the reactor or vortex.

In a preferred embodiment of the invention the reactor is adapted to form a dish-shaped chamber including downwardly depending sides of variable angle such that the time taken for the effluent to travel, in vortex fashion, across the surface of the chamber can be varied. For example, where the downwardly depending sides of the chamber are acute, with respect to the vertical, then the residence time of effluent within the dish-shaped chamber will be less than the instance where the angle is obtuse. This is because the effect of gravity will be greater.

It will be understood by those skilled in the art that the residence time of the effluent within the reaction chamber is important because it will determine the degree of oxidation that takes place. It is desirable to prolong residence time and so prolong contact between effluent and semiconductor film. A vortex arrangement most efficiently ensures this. For example, a vortex reactor employing a fairly thin film of liquid (0.5 to 3 cm) and swirling slowly gives a residence time of 10 to 20 seconds over the reactor surface with appropriate UV illumination.

In an alternative embodiment of the invention the reactor is adapted to form a tubular member such as the sort found in a falling film reactor. In this type of embodiment a much thinner film of liquid is provided, in the order of approximately 1 mm, however the residence time is reduced, in the order of 4 seconds.

However, in yet an alternative embodiment of the invention there is provided a reaction chamber in the form of a spinning disc to which liquid to be treated is delivered and over which the liquid flows. The dispersion of liquid over such a disc is typically efficient and the mass transfer characteristics are good because the effluent forms a highly turbulent thin layer of about 100 micrometers. However, the residence time is significantly reduced and therefore the efficiency of oxidation is likewise significantly reduced.

In the embodiment of the invention comprising a dish-shaped reaction chamber the counter electrode comprises a similarly dish-shaped member which is adapted to be supported in spaced manner ideally above the dish-shaped chamber. In this arrangement the counter electrode is at least partially transparent to said radiation and preferably comprises an electrically conducting mesh. In the instance where the dish-shaped chamber is provided with downwardly depending side walls of variable angle, with respect to the vertical, the counter electrode is similarly fashioned so that the space between the counter electrode and the semiconducting film is substantially even over the surface of the semiconductor.

In the alternative embodiment comprising a disc-shaped reaction chamber the counter electrode comprises an annular member located about the periphery of the spinning disc and space therefrom by a predetermined amount.

It will therefore be apparent that ideally the semiconductor film and counter electrode are positioned parallel and evenly spaced with respect to each other.

It is to be understood that the above described embodiments of the invention are provided for the purpose of comprehension only, it is not intended that the scope of the invention is to be limited thereby, rather the invention concerns any form of embodiment which enables the working of the invention as hereindescribed.

Accordingly, the invention in a further aspect concerns a method for decomposing, organic compounds and/or micro-organisms in a liquid containing them comprising;

a) passing the liquid over a reactor surface that is at least partially coated with a film of electrically conducting semiconductor material, b) irradiating said film, and;

c) applying a voltage between said film and another material

In a preferred method of the invention the other material is a counter electrode spaced therefrom by a predetermined amount.

Preferably the voltage applied is in the order of 1 volt.

In designing the apparatus of the invention we tested a number of semiconductor substrates which had been manufactured in a number of ways. For example, we tested a semiconductor substrate which had been manufactured using conventional anodic techniques where, using electrochemistry, a layer of a semiconductor material is deposited on a substrate; we also tested thermally formed substrates where a metal (titanium) is polished, the thin film of the semiconductor (titanium dioxide) is then formed by oxidation in air. The titanium substrate with its semiconducting oxide layer is then heated under a hydrogen argon atmosphere to activate the film. We also tested a substrate which had a semiconductor film deposited thereon using sol-gel techniques where an organically based solution of a semiconductor material is applied to a substrate and then subsequently heated so that the organic component is evaporated leaving the semiconductor component in contact with the substrate. Finally, we also tested a substrate which had a semiconductor film deposited thereon using an aerogel technique where an aerogel is snthesised using standard sol-gel methods and followed by super critical point drying.

Surprisingly, we discovered that when used, a thermally formed, and an aerogel formed semiconductor layer on a substrate had significantly enhanced oxidation properties. Specifically, we found that such substrate more efficiently oxidised an effluent liquid contaminated with organic compounds and/or bacteria, especially bacterial pathogens.

It is therefore a further object of the invention to provide an apparatus for decomposing one or more organic compounds and/or bacteria in a liquid in a more efficient manner by providing a more efficient semiconductor substrate. Preferably the object of the invention is achieved using a liquid comprising an aqueous electrolyte. Alternatively, the object of the invention is achieved using effluent from a treatment plant.

In a preferred embodiment of the invention said semiconductor material is titanium oxide A further advantage of using a thermally forced semiconductor film lies in the fact that such a film is resistant to corrosion and therefore the stability of the catalyst at the substrate surface is ensured.

The mineralization of organic materials and the destruction of micro-organisms such as bacteria, especially bacterial pathogens, by photocatalytic is clearly a multi-step process, and if the photocatalytic reaction rate is sufficient, intermediates may not have time to escape into solution.

There is, therefore, an advantage in employing a highly porous form of the photocatalyst, as the pores will contsrain any intermediates and so increase the likelihood of their being further oxidised. $TiO_2$, can be generated as a highly porous, free-standing monolith via the formation of an aerogel. Such aerogels have found application in the oxidation of paraffins and olefins, and as photocatalysts for the rededication of organics in water. Aerogels can be synthesized via standard sol-gel methods followed by super critical point drying. Furthermore, we have used a variant of this method to produce an open structure with very large pore size, and have applied it to the photoelectrochemical mineralization of phenol.

In a preferred embodiment of the invention an aerogel formed semiconductor film was exposed to elevated temperature and/or pressure causing the resultant aerogel to have a relatively coarse structure.

Moreover, our investigations have revealed that a doped semiconductor material can be used to advantage to enable the photoelectrochemical oxidation of organic compounds and/or micro-organisms such as, especially bacterial pathogens with radiation from the visible region of the spectrum. More specifically, the doping of semiconductor material with compounds that alter the band gap of a semiconductor material so as to facilitate promotion of electrons from the valence band to the conduction band on irradiation by supra band gap light in the visible region of the spectrum can be used to advantage since they enable photoelectrochemical oxidation to be undertaken using solar radiation.

A particular method of manufacture of an aerogel catalyst for use in the present invention comprises:

a) providing a semiconductor sol in a fluid phase, that is to say a phase prior to gelation of the sol;

b) heating the sol to a temperature of between 240 to 300° C. at a rate of 1° C. per minute and at a pressure of between 200 to 500 psi;

c) maintaining said temperature and pressure conditions for 20–40 minutes; and d) allowing the aerogel to cool.

Preferably, the sol is a titanium based sol. Preferably, the sol is doped and, more preferably, doped with Nb.

In a preferred embodiment of the invention Nb is used to dope the semiconductor material.

The present invention provides an efficient, cost effective and environmentally acceptable means for converting organic waste materials into a form in which they are suitable, with or without further treatment of the liquid medium in which they are contained, for discharge in an aqueous effluent stream in a conventional manner.

The present invention is particularly suitable for decomposing organic complexing agents especially when complexed with metal species such as radionuclides, for example actinides or fission products, or with toxic heavy metals. Examples of such complexing agents include carboxylic acids such as citric acid and EDTA (ethylene diamine treraceric acid), phenols, salicylic acid and formates. Use of the invention provides conversion of the organic complexing agents into small molecules such as carbon dioxide and water or other species having no significant complexing activity. Spent liquids containing organic complexing agents complexed with metal species which are treated in this way are therefore rendered suitable for treatment to remove the released metal species. For example, the metal species may be separated in a conventional way such as by precipitation, ion exchange or evaporation. After decomposition of the complexes and separation of the metal species the liquid may be released as discharge effluent.

The present invention may also be employed to treat liquid containing free phase organic wastes, such as solvents, lubricating oils and cutting oils. These can be converted into small non-toxic non-complexing species and metal ions and other potentially toxic inorganic species associated therewith are passed into solution for conventional treatment subsequently rendering the liquid suitable for release as a conventional aqueous discharge effluent.

The liquid to be treated by the present invention may comprise an aqueous liquid containing the organic species to be decomposed. The liquid may contain less than 10% by volume, eg less than 1% by volume, of one or more of the organic species to be decomposed.

The present invention may be employed to treat phenols. The degradation of phenol may be most simply represented by scheme 1:

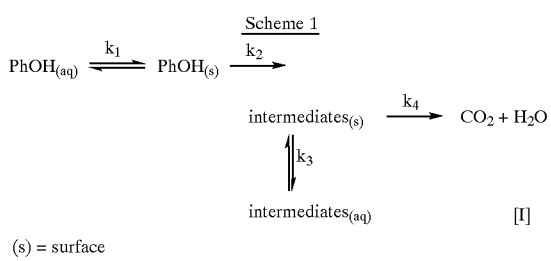

Scheme 1

(s) = surface

In essence, the oxidation may be thought to occur in at least four steps. The first step is the diffusion of the phenol to the semiconductor surface where it may then be oxidised to some intermediate product. At this point, the intermediate may then diffuse away out to the bulk of the solution, or it may remain and be further oxidised, ultimately to carbon dioxide and water. In the case of the reaction at open circuit, the intermediate products have time to diffuse away from the catalyst surface and into the bulk solution before encountering another active site. With a potential bias applied, however, the ram of electron/hole recombination is greatly decreased, allowing many more of the holes that arrive at the surface to oxidise the organic species present in solution. This ensures that most of the intermediates are oxidised before diffusion away from the catalyst such as the aerogel can occur. The net increase in oxidation of organic substrates with increasing anodic potential has been observed by us previously using non porous catalysts.

In addition, the present invention provides an efficient, and cost effective means for destroying microorganisms such as bacteria, especially bacterial pathogens in water supplies.

In particular, the present invention is suitable as a final polishing stage for use in water treatment plant, to destroy micro organisms such as bacteria, especially bacterial pathogens prior to supplying to end-users.

Embodiments of the invention will now be described by way of example only wit reference to the accompanying figures wherein.

BRIEF DESCRIPTION OF THE DRAWINGS

FIG. 5 is a graph showing oxidation of phenol in a vortex reaction chamber using a titanium oxide semiconductor film.

FIG. 6 is a graph showing degradation of phenol in a photoelectrochemical reactor according to the invention.

Figure 1:
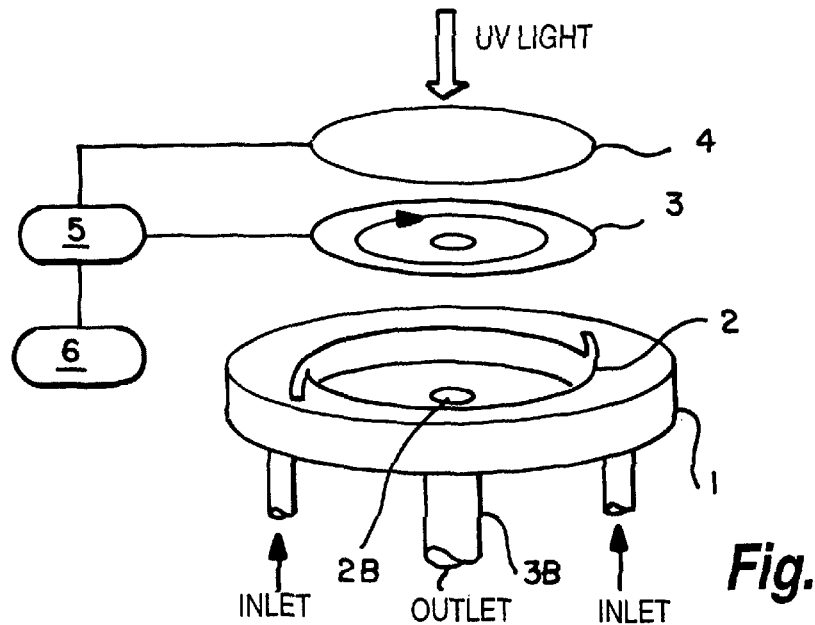
FIG. 1 represents a diagrammatic illustration of a first apparatus in accordance with the invention (3—Catalyst: arrow-fluid flow).

Referring firstly to FIG. 1 there is shown an apparatus for photoelectrochemically oxidising organic compounds in effluent. The apparatus comprises a dish-shaped reaction chamber 1 which has, on its upper outer most surface, a thermally formed semiconductor film or layer of titanium oxide 3. Towards the upper inner most surface of chamber 1 there is provided an inlet 2 arranged so that effluent ejected therefrom strikes said inner surface of chamber 1 in a tangential fashion so as to flow, firstly, around the outer most edge of the inner surface of chamber 1 and then to flow, progressively inwardly in a circular manner so as to trace the shape of a vortex. Centrally, in the lower surface of chamber 1 there is provided an outlet 2B in communication with removal conduit 3B.

Ideally a pair of oppositely spaced, similarly positioned, inlets are provided.

In the embodiment shown in FIG. 1, chamber 1 is dish-shaped and the downwardly depending walls of the chamber are substantially vertical. However, in alternative embodiments of the invention the downwardly depending walls may be angled so as to selectively control the residence time of effluent flowing over the inner surface of the chamber.

In the embodiment shown in FIG. 1 the catalytic semiconducting film or layer 3 is diagrammatically illustrated above the chamber to which it is applied for the purpose of comprehension only.

Provided adjacent, and ideally opposite the semiconducting film 3 is a counter electrode 4. Counter electrode 4 is permeable to irradiation such as ultraviolet or visible light and most typically comprises an electrically conducting mesh or the like. Counter electrode 4 is further fashioned so that it is the same shape as semiconductor film 3 and thus can be located parallel therefrom so as to ensure that a substantially even distance is provided between said semiconductor film 3 and said counter electrode 4.

A voltage means such as a potentiostat 5 and reference electrode 6 are provided, or simply a DC voltage source such as a battery whereby a voltage can be provided across semiconductor film 3 and counter electrode 4. Typically, a voltage in the order of 1 volt is applied across the semiconductor film 3 and counter electrode 4.

Figure 2:
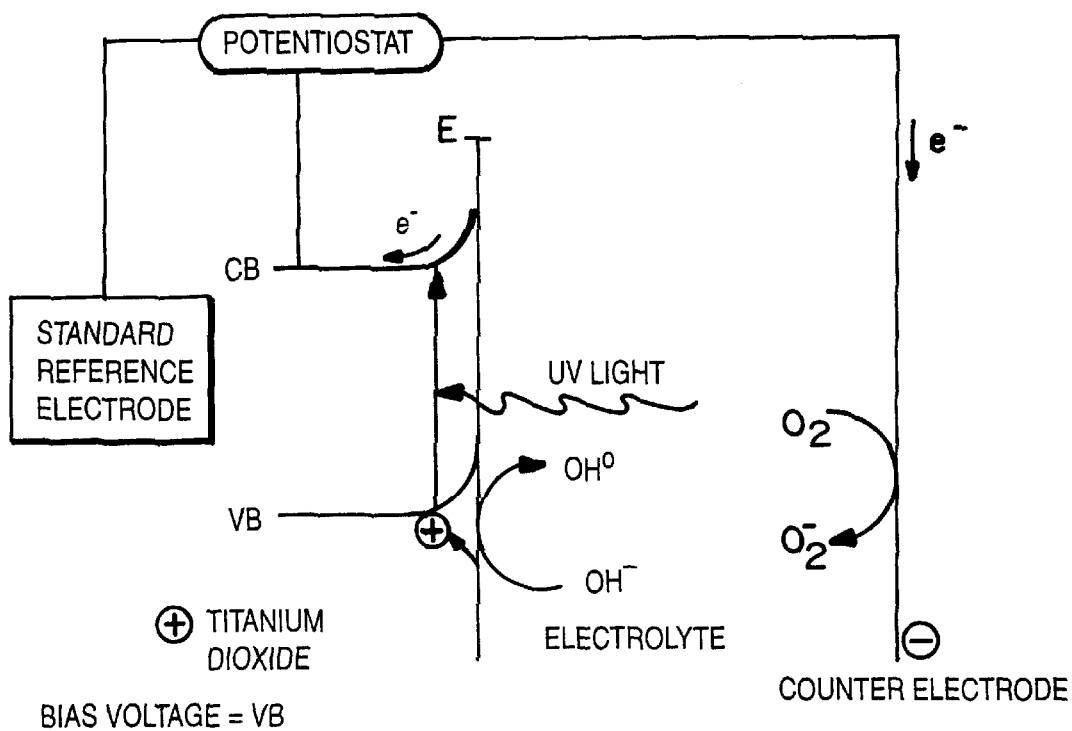
FIG. 2 represents a schematic illustration of the working of the invention (VB-Bias Voltage).

The working of the invention is shown in FIG. 2 where in can be seen that radiation, such as ultraviolet light, striking the surface of the catalytic semiconductor film 3 brings about the liberation of an electron and the creation of a hole or positive charge.

As a result of the voltage created between the semiconductor film 3 and the counter electrode 4, liberated electrons are made to flow towards the counter electrode where they can be used for the reduction of species such as oxygen. The removal of liberated electrons increases the likelihood that holes will successfully migrate to the surface of the semiconductor film and so be available for interaction with water in the effluent liquid to create OH radicals, which radicals in turn bring about oxidation of organic compounds within the effluent.

Figure 3:
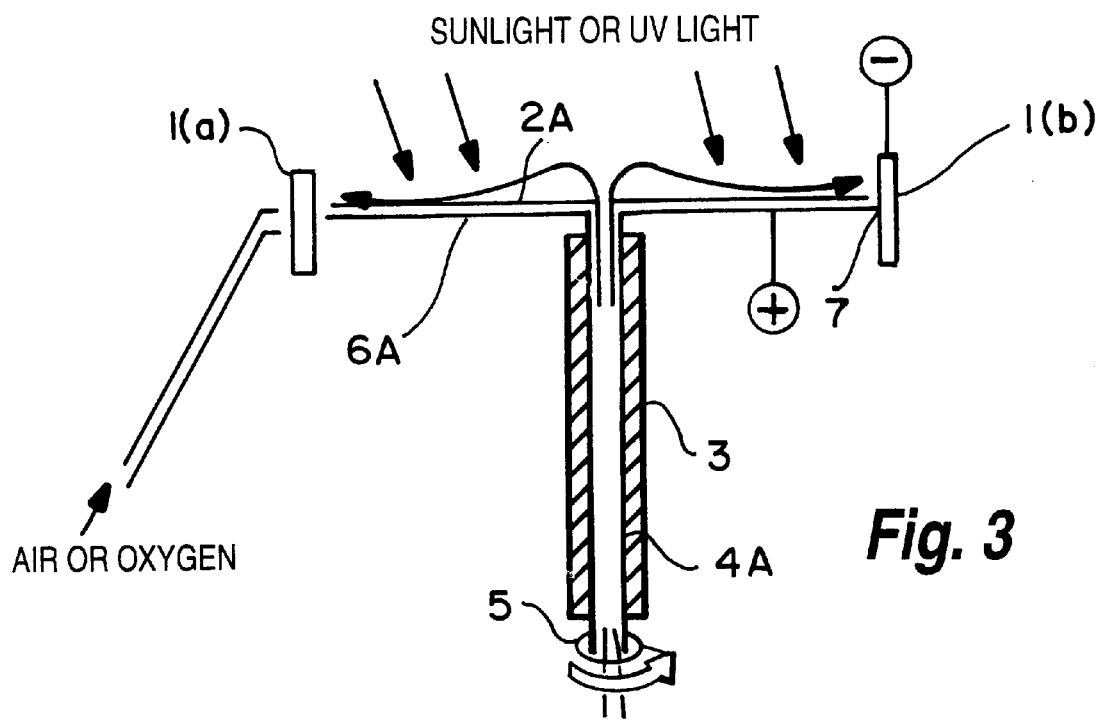
FIG. 3 represents a diagrammatic representation of a second embodiment of the invention (Photoelectrochemical Purification set up: 1(*a*) and (*b*) Porous cathode with current collector; 2—$TiO_2$ Substrate coating on metal disc; 3—Collar: 4—Rotating axle supplying water; 5—Electrical slip-ring contact; 6—Metal Current-collector; 7—Thin electrolyte gap).

FIG. 3 shows yet an alterative embodiment of the invention where a reaction chamber is fashioned in the shape of a disc 6A and provided with an upper outer thin film of semiconducting material 2A. Disc 6A is supported on a hollow rotating axle 4A.

Provided about the outer most perimeter of disc 6A is an annular counter electrode 1A.

Optionally, an air or oxygen supply means is also provided for the purpose of ensuring that adequate oxidation of effluent takes place so as to increase the efficiency of the photoelectrochemical reaction.

In use, effluent is pumped upwardly through rotating axle 4A and emerges centrally on the upper most surface of disc 6A. Centrifugal forces assist in the passage of effluent outwardly across the upper surface of disc 6A towards the outer perimeter of the same. This arrangement results in the creation of a relatively turbulent flow of a thin film of effluent over the upper most surface of the disc 6A.

A voltage means, not shown, is provided so as to create a potential difference between the semiconductor film 2A and the annular counter electrode 1A so that electrons liberated as a result of interaction of the semiconductor film with sunlight or ultraviolet light are transported away from the correspondingly generated holes, thus favoring photoelectrochemical oxidation of organic species.

Figure 4:
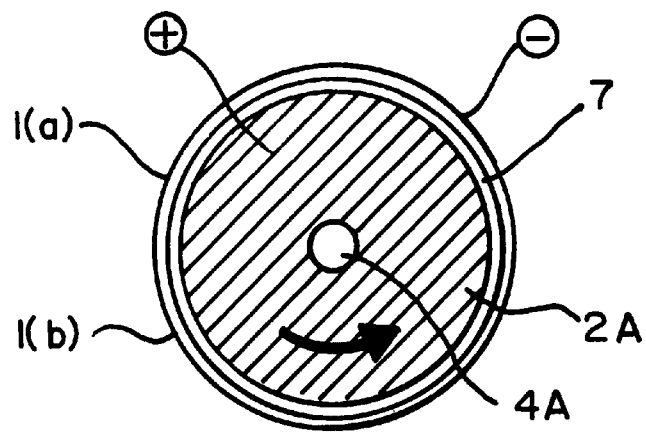
FIG. 4 represents a plan view of the embodiment shown in FIG. 3 (1 (*a*)—Porous cathode; 1(*b*) Current collector; 2—$TiO_2$ Substrate coating on metal disc; 4—Rotating axle supplying water; 7—Thin electrolyte gap).

The arrangement described in FIGS. 3 and 4 tends to be less efficient than that described in FIG. 1. This is because power is required in order to rotate the disc and furthermore the residence time of effluent on the semiconductor surface is reduced, thus the time for oxidation of organic compounds is reduced.

In yet a further preferred embodiment of the invention, not shown, a single radiation source such as a UV light source may be provided and positioned so that radiation emanating therefrom is made to strike the semiconductor film. To increase the efficiency of radiation a reflector, ideally a parabolic reflector, may be provided adjacent to and to the rear of, the radiation source, with respect to the semiconductor film, to ensure that radiation is reflected onto the semiconductor film.

Alternatively, a plurality of radiation sources may be provided so as to ensure that either uniform or non-uniform radiation of the semiconductor film takes place. In the instance where non-uniform radiation of the semiconductor film takes place, advantageously, the majority of radiation will be directed towards the outer most part of the reaction chamber, that is to say the part of the reaction chamber exposed to effluent containing the highest concentration of organic compounds relative to the concentration gradient that will be provided along the surface of the reaction chamber.

In yet a further preferred embodiment of the invention, not shown, variable voltage means may be provided between the semiconductor film and the counter electrode so that a voltage gradient may be created, which gradient increases in intensity towards the outer most part of the reactor thus ensuring that at the site of highest concentration of organic compounds electrons are most efficiently removed.

The semiconductor film 3 shown in FIG. 1, or 2A shown in FIG. 3 is ideally thermally formed. This is undertaken using the following method.

A substrate of preselected material, such as titanium metal is polished and oxidised in air. This results in the formation of a thin film of the semiconducting oxide. This is then heated to 630 degrees Centigrade in a mixture of hydrogen and argon for approximately 3 hours. The substrate is then cooled to room temperature and is then ready for use in the invention. It will be apparent that it will be advisable to fashion or shape the substrate according to the type of reaction chamber required before thermally forming a semiconductor film.

Turning now to FIG. 5 there is shown a graphical representation of the efficiency of various types of photoelectrochemical reactors. The Y axis represents the percentage of phenol concentration in an effluent sample and the X axis represents time. The graph represented by diamond-shapes shows that over a period 60 minutes the phenol concentration falls to approximately 75% when the effluent is exposed to UV radiation only.

The graph represented by squares shows that over a period of 60 minutes the phenol concentration falls to approximately 65% when effluent is exposed to an oxidation reagent generated as a result of irradiation of a semiconductor material.

The graph represented by triangles shows that over a period of 60 minutes the phenol concentration falls to 45% when effluent liquid is made to flow over a reactor in accordance with the invention, which reactor includes exposure of a semiconductor material to UV light in the presence of an applied voltage.

FIG. 6 shows graphically how the concentration of phenol in the reactor falls with time (represented by diamonds). FIG. 6 also shows how the concentrations of reaction intermediates vary with time, ie quinol (represented by triangles) and catechol (represented by squares).

It can be seen that use of a photoelectrochemical apparatus in accordance with the invention results in the decomposition of phenol. Notably the concentration of phenol falls rapidly and is almost eliminated in the first hour. The concentrations of Quinol and Catechol, intermediate organic compounds, initially increase to a value of approximately 60%, within the first forty minutes and then subsequently decline until elimination occurs after 120 minutes.

The data shown in FIGS. 5 & 6 clearly illustrate the efficiency and effectiveness of the apparatus of the invention and shows how the combination of photocatalysis of a semiconductor film and electrochemical control of the generated ion species can be used to good effect in the removal of contaminants from an effluent.

Formulation of Aerogel Catalyst

Figure 7A:
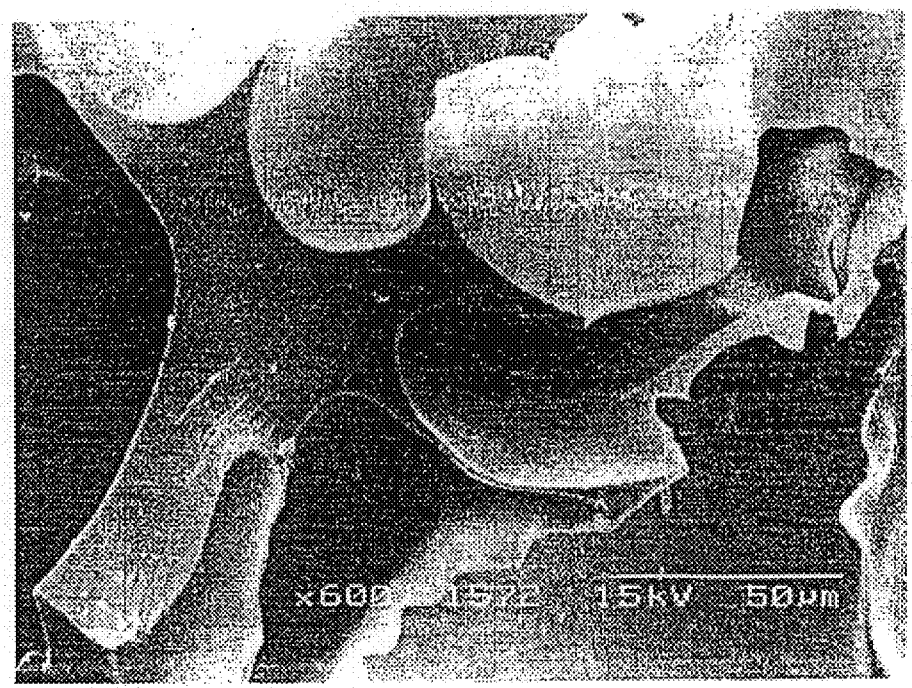
FIG. 7A is a SEM micrograph of titanium dioxide aerogel according to the fourth aspect of the invention and FIG. 7B is an illustrative view of the photograph in FIG. 7A.
Figure 7B:
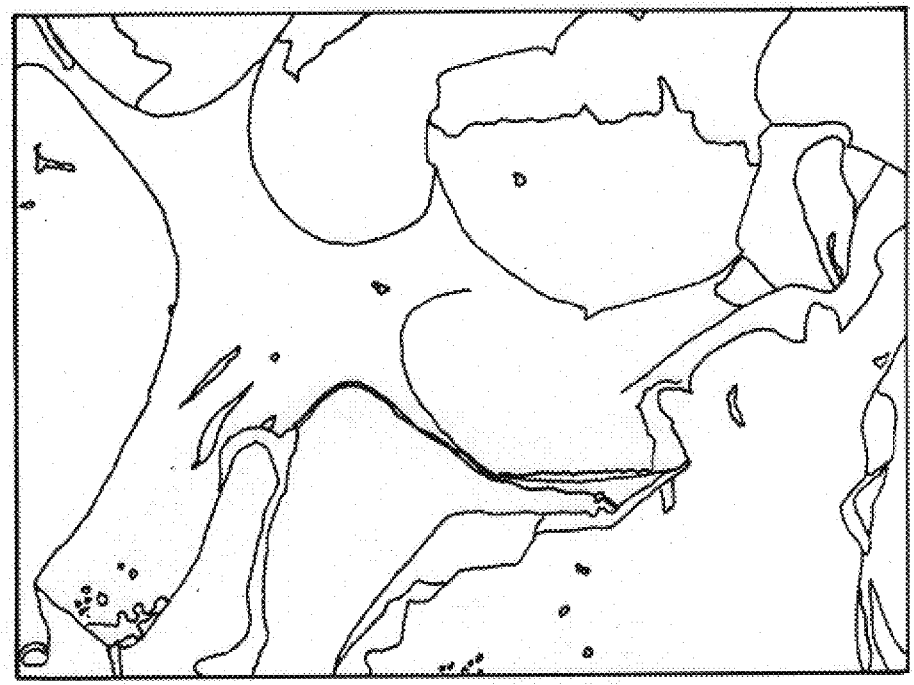

Titanium alkoxide sols were formed from an 1:1:0.008.8 molar ratio of titanium isopropoxide: 18MΩ water: HCl: anhydrous ethanol, respectively. Water was obtained from a Millipore purification system, other reagents were obtained from Aldrich, and used without purification. The sols were placed in an autoclave before gelation occurred, and then heated at a rate of 1° C. per minute to between 240 to 300° C., at a pressure of between 200–500 psi. This temperature was maintained for between 20 to 40 minutes before venting the autoclave and allowing the aerogel to cool. This procedure resulted in a porous, semi opaque aerogel, and XRD revealed that the titanium dioxide was present in the anatase form. From SEM micrographs, the average pore size was estimated to be of the order of 40 $\mu$m (see FIGS. 7A and 7B). This value is approximately two orders of magnitude greater than that reported by other workers. This may be due to the fact that the catalyst was gelled at elevated temperature and pressure-causing the resultant aerogel to have a relatively coarse structure.

Figure 8:
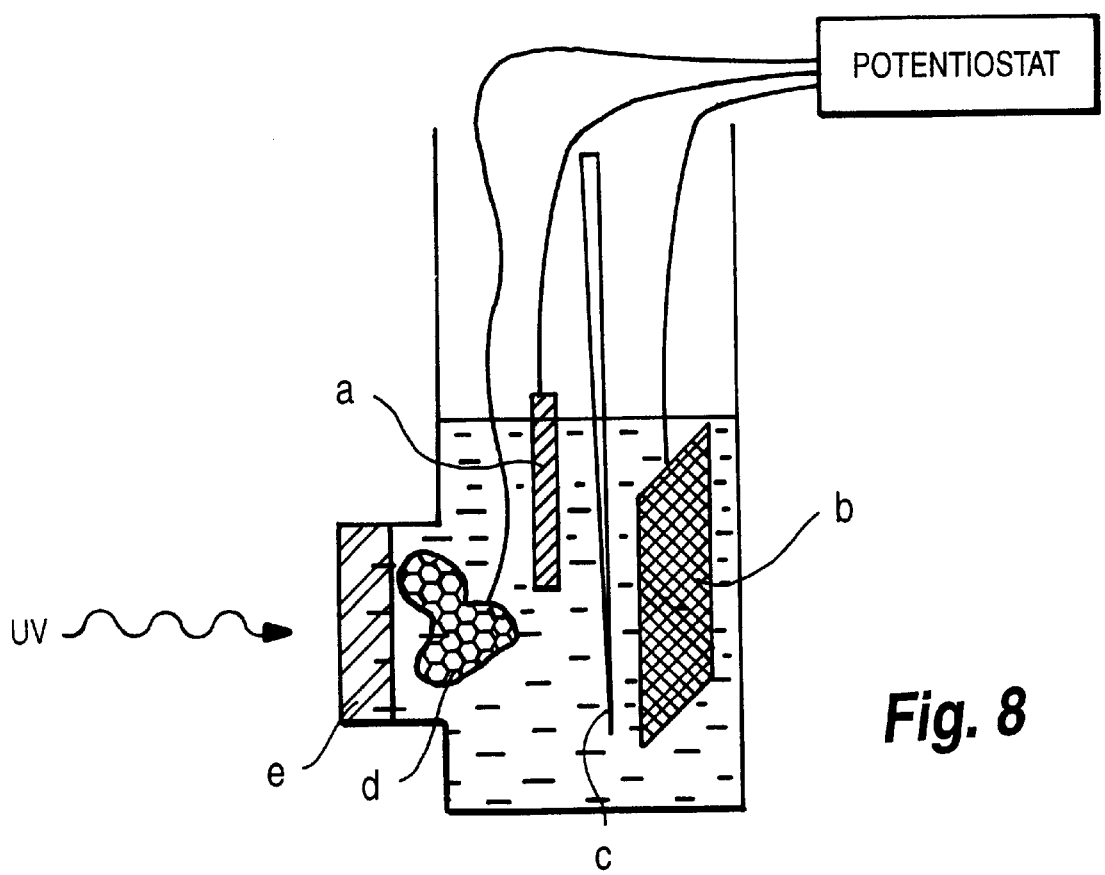
FIG. 8 is a Schematic diagram of the experimental photoelectrochemical cell: (a) SCE reference electrode; (b) platinum counter electrode; (c) oxygen sparge; (d) aerogel and (e) quartz window.

All degradation experiments were performed in the experimental reaction cell shown in FIG. 8 using 20 ml of oxygen-satiated 250 μM phenol in pure water, and an approximately 1 cm³ cube of aerogel (d). Electrical contact to the aerogel was made using conducting Araldite. Photoelectrochemical experiments were carried out with the aerogel held at 0.5 V vs. S.C.E. and irradiated by a 100 W medium pressure mercury arc lamp; the irradiated area was ca. 1 cm² through a quartz window (e). Potential control of the aerogel electrode was maintained by an Oxsys Micros potentiostat and all potentials were measured with respect to a saturated calomel reference electrode (a). Analyses of products were performed by HPLC with a Waters C18 Novapak column.

Cyclic voltammograms of the aerogel electrode were obtained with the aerogel in the dark and under illumination. The capacitive dark currents were typically quite high ca. 150–200 μA, and the photocurrents relatively low ca. 25 μA.

Figure 9A:
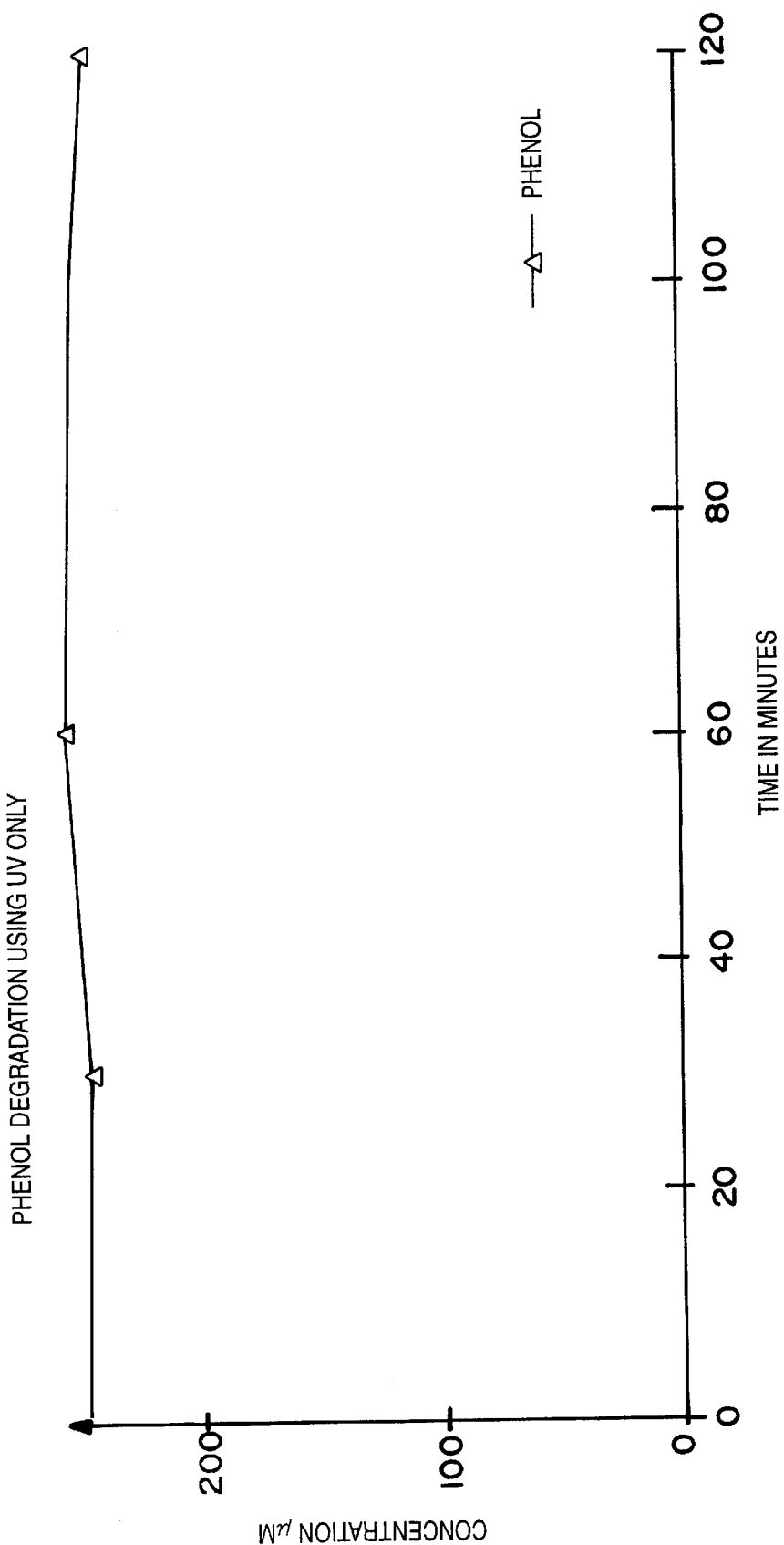
FIG. 9 is a graph showing Phenol degradation using (a) ultraviolet light alone, (b) ultraviolet light with aerogel catalyst, (c) ultraviolet light with the aerogel catalyst held at 0.5 V vs S.C.E.
Figure 9B:
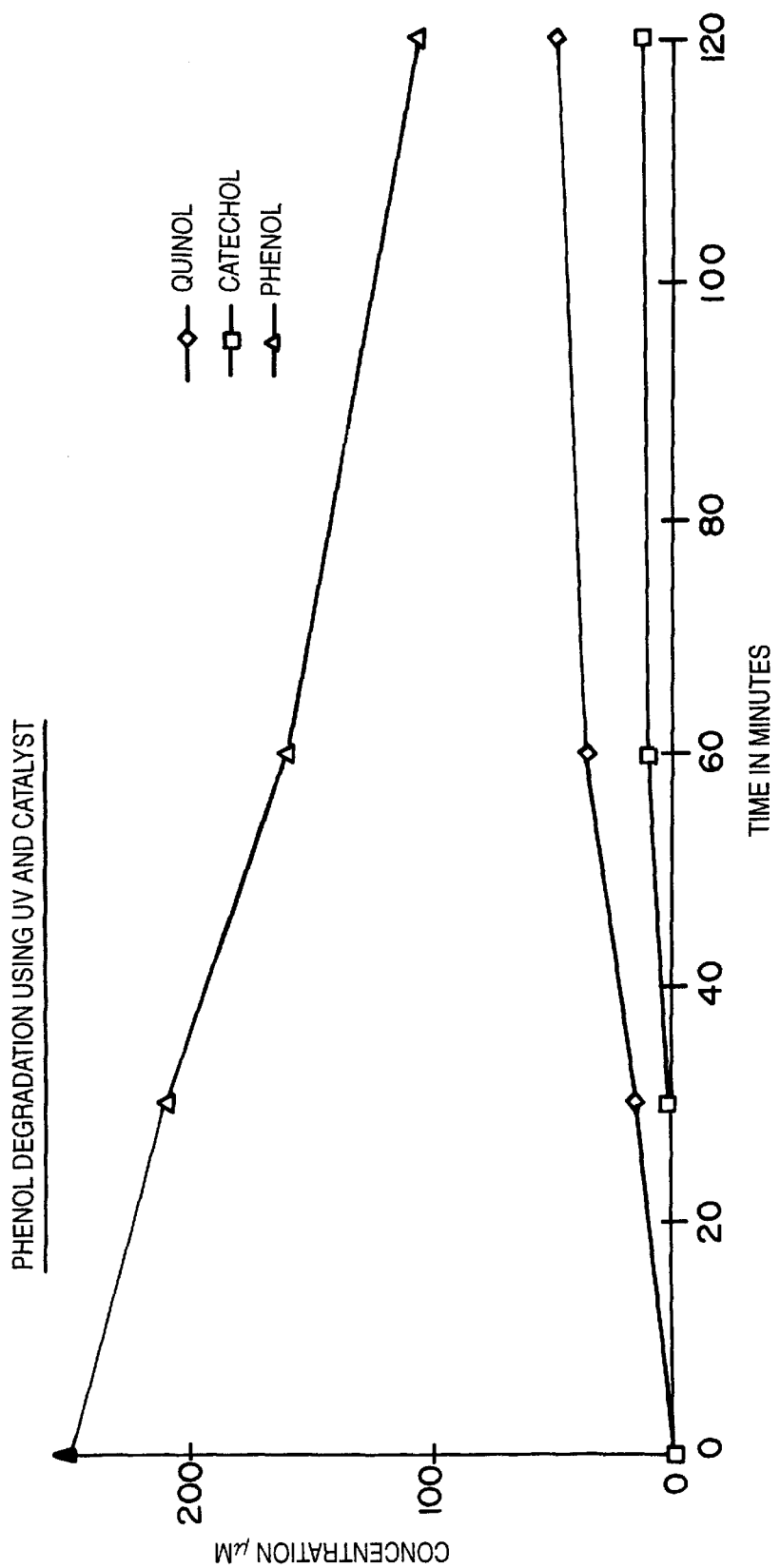
Figure 9C:
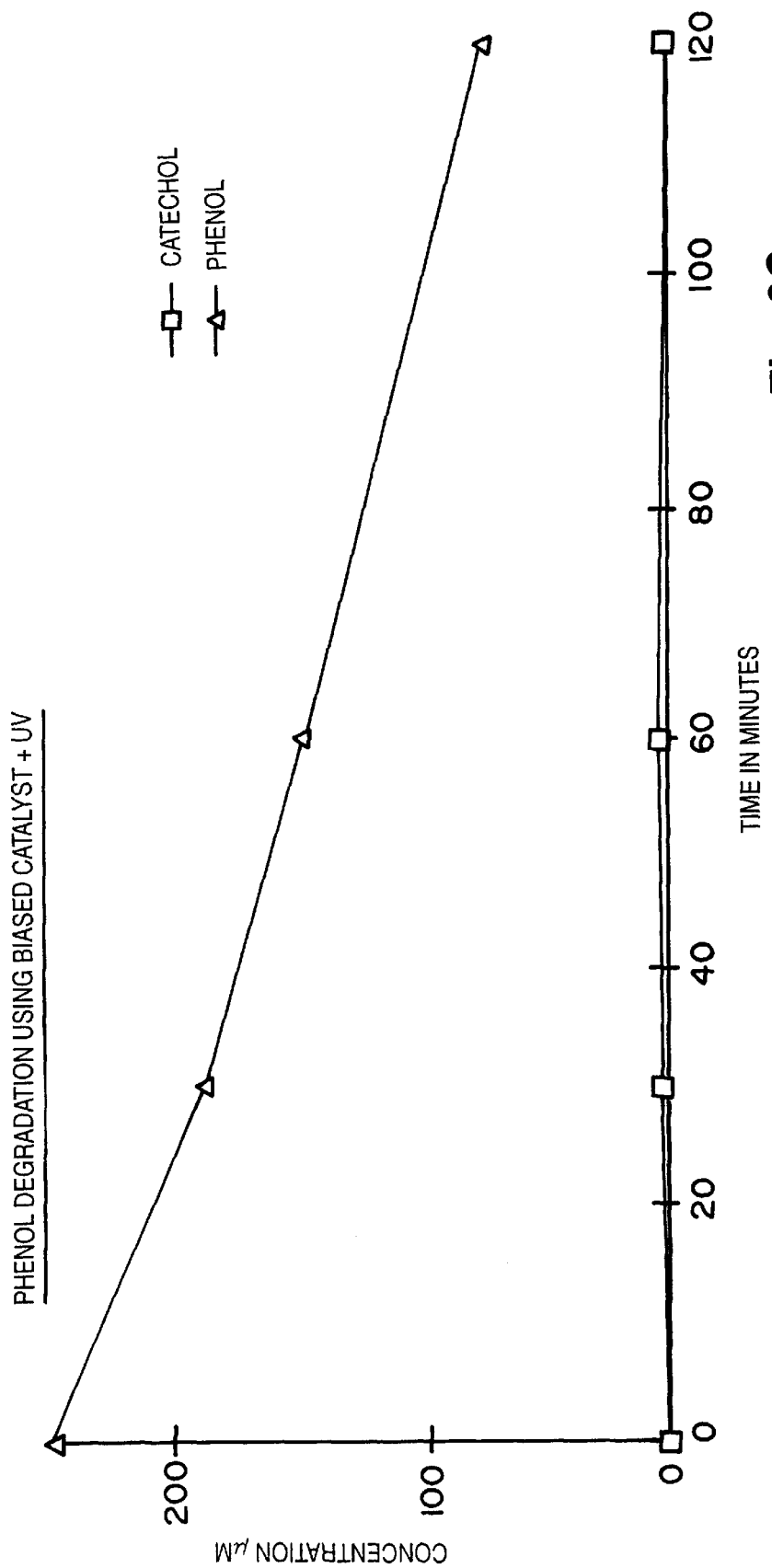

In the absence of the aerogel electrode, irradiating the phenol solution appeared to have no effect, (see FIG. 9[a]). Irradiating the aerogel at open circuit resulted in phenol degradation, as can be seen from FIG. 9[b], with the phenol concentration falling to ca 45% of its initial value after 2 hours. However, appreciable quantities of intermediates were detected, including catechol and quinol, and the solution turned a deep pink colour. When the aerogel was held at 1.0 V and irradiated, (see FIG. 9[c]), the phenol concentration decreased to 30% of its initial value in two hours, with only one intermediate, catechol, being produced, and then subsequently mineralized. These results compare very well with our preliminary investigations using anodically formed and dip-coated sol-gel formed catalysts in similar systems, which generally reduced the phenol concentration to only 95/98% of its initial value over the same timescale, and under comparable conditions.

The performance of the aerogel electrode is significantly better than that of simple anodic or sol-gel films of the same exposed area. The fact that the observed chemistry is substantially simpler with the applied electric field than when the irradiation was carried out at open circuit is almost certainly a result of the increased efficiency of electon/hole separation, resulting in an enhanced oxidation rate mineralizing any intermediates before they could escape out of the semiconductor pores.

The fact that these aerogels can be made as free-standing blocks could, in principle be put to advantage in the construction of highly efficient photoelectrochemical reactors.

The bacterium E-Coli is employed as an indicator of water quality by health authorities. The presence of the organisms in chlorinated water indicates an unsatisfactory supply. We have employed one of our existing falling filter reactors, (catalyst film area 125 cm², 10 W water pump, 16 W commercial UV-B lamp, in preliminary experiments on the disinfection of water containing E-Coli. Five liters of water containing 10,000 to 100,000 bacilli per cm³ were employed, two types of $TiO_2$ film assessed, and the results are shown in FIG. 10.

When the UV-B lamp was employed (curve 1), little or no disinfection was observed. Bacterial lamps operate in the UV-C region, (<285 nm); UV-B is known to be much less bactericidal. Similarly, if an electric field was applied to the semiconductor films in the dark (curve 2), or the semiconductor films were irradiated in the absence of an electric field (curves 3 & 4) little effect was noted. However, if the semiconductor films were irradiated with an applied potential of +0.5 V vs the SCE reference electrode, (curves 5 & 6). the water was completely disinfected in as little as 10 minutes, corresponding to a residence time of 1 second, with no noticeable change in pH.

Figure 10:
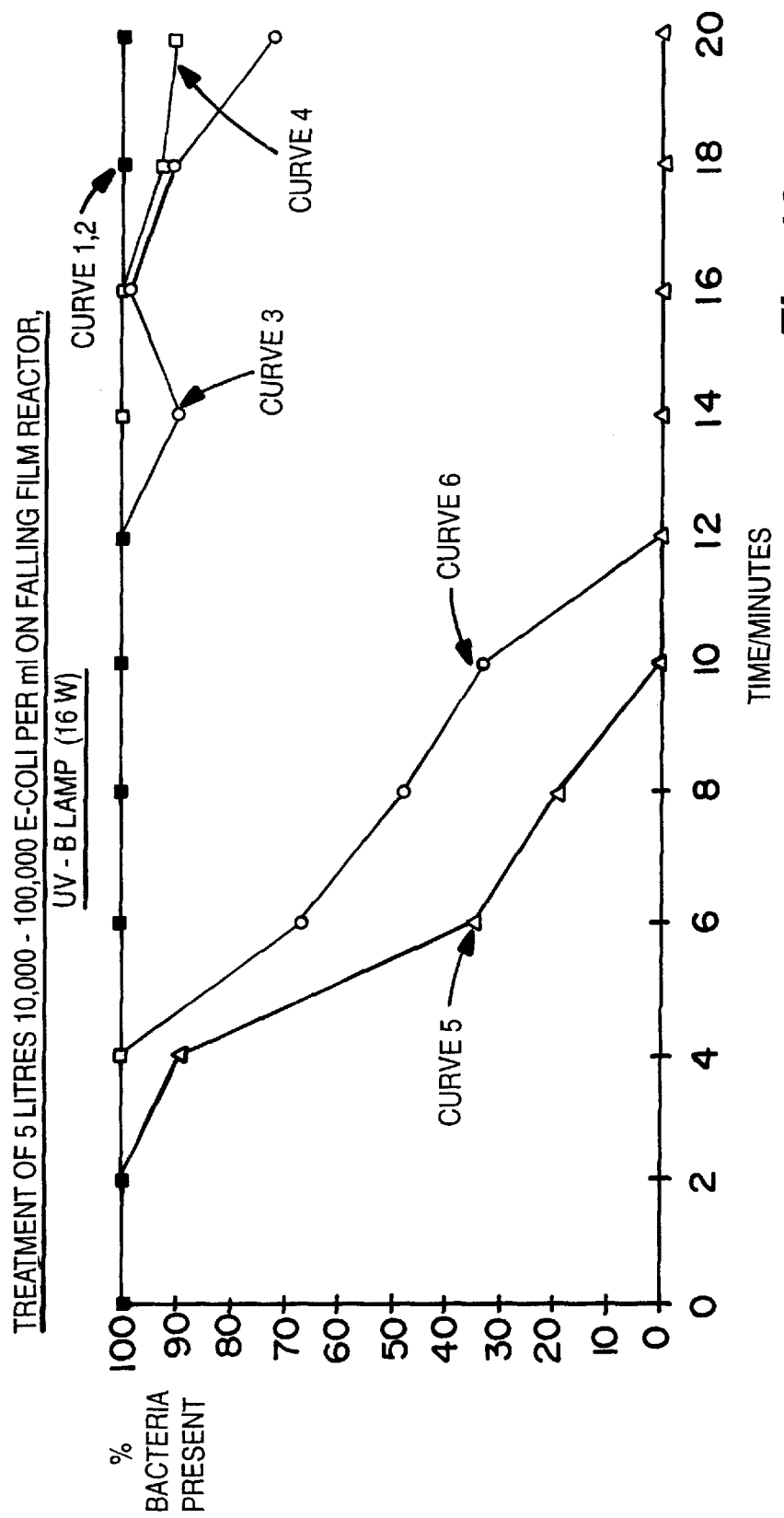
FIG. 10 is a graph showing the disinfection of water using a falling film reactor.

The results presented in FIG. 10 are remarkable, even without allowing for the fact that the system was in no way optimised, with a cost of 1 kWh per c. 2000 liters of water, (if the cost of the pump is discounted).

We claim:

1. An apparatus for treating a liquid to decompose organic material and/or micro organisms contained therein which comprises;
   a reactor, over which, in use, the liquid flows, comprising a substrate which is at least partially coated with a film of semiconductor material and which is orientated with respect to an irradiation source such that radiation from said source can be absorbed by said semiconductor material to bring about a photochemical reaction; and further wherein there is provided a voltage means whereby a voltage can be applied between said semiconductor material and another material so as to ensure that electrons liberated by said photochemical reaction are transported away from said semiconductor material.

2. An apparatus according to claim 1 wherein said other material is a counter electrode which is spaced from the semiconductor material by a predetermined distance and voltage means is used to apply a voltage across said semiconductor material and said counter electrode.

3. Apparatus according to claim 2 wherein said distance is selected, at least, to accommodate a layer of said liquid.

4. An apparatus according to claim 1 wherein there is further provided at least one artificial irradiation source which is positioned with respect to the apparatus such that radiation emanating therefrom is directed to said semiconductor material.

5. Apparatus according to claim 4 wherein a plurality of artificial irradiation sources are provided and selectively positioned so as to determine the location and amount of radiation absorbed by different parts of the semiconductor material.

6. An apparatus according to claim 1 wherein said reactor is adapted such that liquid to be treated and flowing thereon traces the form of a vortex.

7. An apparatus according to claim 6 wherein the reactor is adapted such that liquid delivered thereto is delivered tangentially, with respect to the horizontal plane of the reactor.

8. An apparatus according to claim 6 wherein the reactor comprises a dish-shaped chamber.

9. An apparatus according to claim 8 wherein said chamber is provided with adjustable downwardly depending sides so that the angle of said sides, with respect to the vertical, can be varied thus varying the residence time of said liquid in said chamber.

10. An apparatus according to claim 1 wherein the reactor comprises a tubular member, having an irradiation source located therein, and liquid is arranged to fall therethrough.

11. An apparatus according to claim 10 wherein said irradiation source comprises an elongate member located coaxially within said tube.

12. An apparatus according to claim 10 wherein said irradiation source is located centrally within said tube.

13. An apparatus according to claim 1 wherein the reactor comprises a disc-shaped member.

14. An apparatus according to claim 13 wherein said disc-shaped member is adapted to rotate.

15. An apparatus according to claim 13 wherein means are provided for delivering liquid centrally to the uppermost surface of said disc-shaped member.

16. An apparatus according to claim 13,
   wherein said other material is a counter electrode which is spaced from the semiconductor material by a predetermined distance and voltage means is used to apply a voltage across said semiconductor material and said counter electrode, wherein said counter electrode comprises an annual member located about the periphery of the disc-shaped member.

17. An apparatus according to claim 6, wherein said other material is a counter electrode which is spaced from the semiconductor material by a predetermined distance and voltage means is used to apply a voltage across said semiconductor material and said counter electrode, wherein said counter electrode is fashioned so as to complement the shape of the outermost surface of said reactor.

18. An apparatus according to claim 10, wherein said other material is a counter electrode which is spaced from the semiconductor material by a predetermined distance and voltage means is used to apply a voltage across said semiconductor material and said counter electrode, wherein said counter electrode is provided in said tubular member between the innermost surface of same and said irradiation source.

19. An apparatus according to claim 18 wherein said counter electrode is of a tubular shape.

20. An apparatus according to claim 17, wherein said counter electrode is at least semi transparent to the passage of said radiation.

21. An apparatus according to claim 1 wherein said liquid comprises an aqueous electrolyte.

22. An apparatus according to claim 1 wherein the semiconductor film is thermally formed.

23. An apparatus according to claim 1 wherein the semiconductor film is aerogel formed.

24. An apparatus according to claim 1 wherein said semiconductor film comprises titanium oxide.

25. An apparatus according to claim 1 wherein the semiconductor material is doped.

26. An apparatus according to claim 25 wherein the semiconductor material is doped with niobium.

27. A method for decomposing organic compounds and/or micro-organisms in a liquid containing them comprising:

a) passing the liquid over a reactor surface that is at least partially coated with a film of semiconductor material;

b) irradiating said film, and, c) applying a voltage between said film and another material.

28. A method according to claim 27 wherein said other material is a counter electrode spaced therefrom by a predetermined amount.

29. A method according to claim 27 wherein the applied voltage is in the order of 1 volt.

30. A method according to claim 28 wherein said liquid comprises effluent from a water treatment plant.

31. A method according to claim 27 wherein said liquid comprises effluent from a water treatment plant.

* * * * *